United States Patent

[11] 3,602,120

[72] Inventor Floyd M. Galbraith, Jr.
Rochester, N.Y.
[21] Appl. No. 767,140
[22] Filed Oct. 14, 1968
[45] Patented Aug. 31, 1971
[73] Assignee Eastman Kodak Company
Rochester, N.Y.

[54] MECHANISM FOR USE WITH PHOTOGRAPHIC APPARATUS TO AUTOMATICALLY CONTROL FLASH IN RESPONSE TO SCENE BRIGHTNESS
11 Claims, 5 Drawing Figs.

[52] U.S. Cl. .................................................. 95/11.5 R, 95/10 C
[51] Int. Cl. .................................................. G03b 15/04
[50] Field of Search ........................................... 95/11, 11.5; 431/92, 93, 97

[56] References Cited
UNITED STATES PATENTS

| | | | |
|---|---|---|---|
| 590,204 | 9/1897 | Blackmore .................. | 95/11.5 |
| 744,540 | 11/1903 | Hammer ..................... | 95/11.5 |
| 3,406,620 | 10/1968 | Hockreiter et al. .......... | 95/11 X |
| 3,439,992 | 4/1969 | Shaffer et al. ............... | 431/93 |

Primary Examiner—Samuel S. Matthews
Assistant Examiner—M. L. Gellner
Attorneys—Robert W. Hampton and John D. Husser ABSTRACT: Photographic apparatus such as a still camera for accepting flashlamp units having lamps fireable by striking and selectively controlling the firing of the lamps by selectively either manually or automatically preventing such striking. The lamps may be incorporated in a multilamp unit, and the apparatus may have a mechanism to index the unit only when the lamp is operative position is fired.

PATENTED AUG 31 1971

FLOYD M. GALBRAITH JR.
INVENTOR.

BY *John M. Hussan*
*Robert W. Hampton*
ATTORNEYS

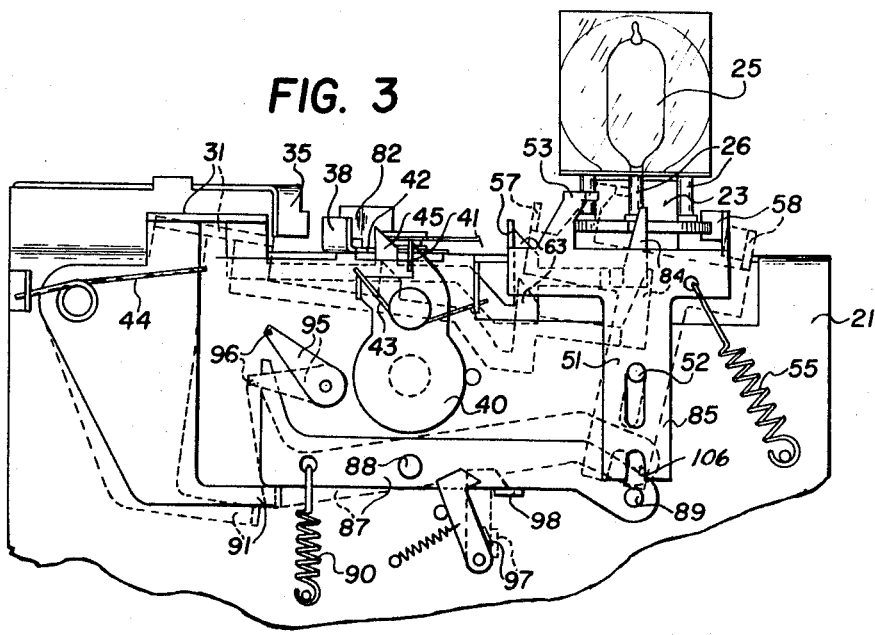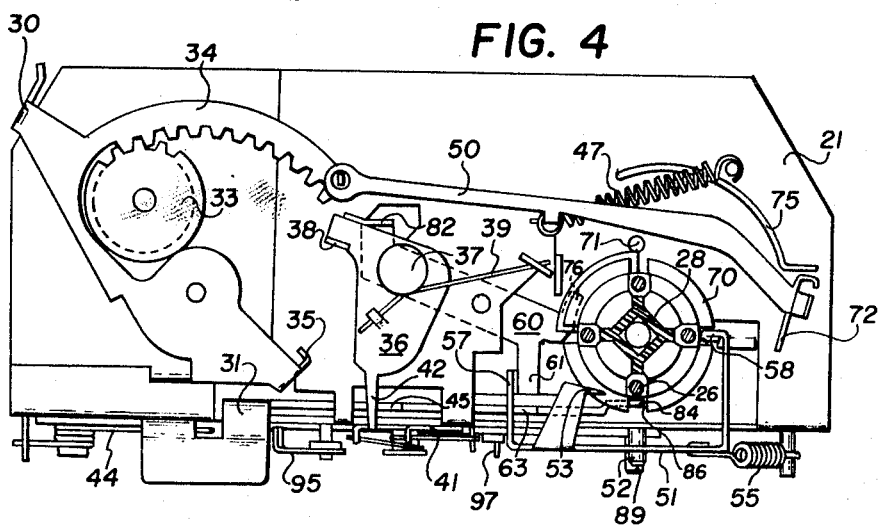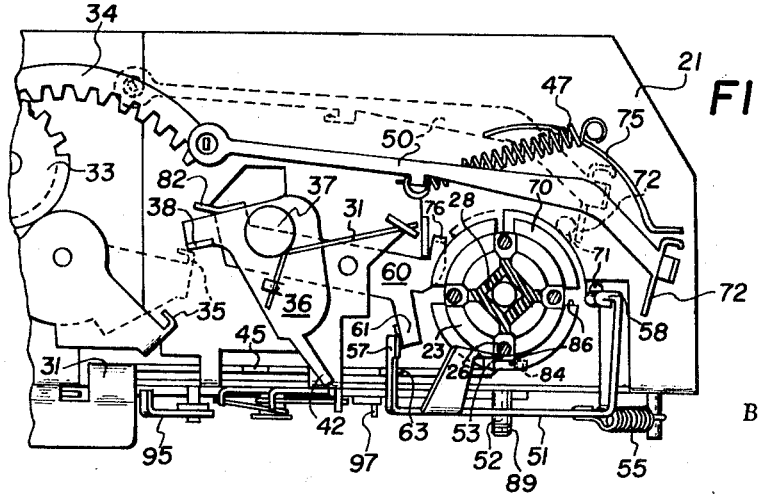
FLOYD M. GALBRAITH JR.
INVENTOR.
ATTORNEYS

MECHANISM FOR USE WITH PHOTOGRAPHIC APPARATUS TO AUTOMATICALLY CONTROL FLASH IN RESPONSE TO SCENE BRIGHTNESS

CROSS-REFERENCE TO RELATED APPLICATIONS

Reference is made to the following U.S. Patents:

U.S. Pat. No. 3,406,620 entitled "Automatic Control for Daylight or Flash Operation of a Camera" issued Oct. 22, 1958, in the names of William T. Hochreiter et al.

U.S. application Ser. No. 765,930, entitled "Multilamp Flash Unit," filed Oct. 8, 1968, in the name of David E. Beach.

U.S. application Ser. No. 765,926, entitled "Percussion Activatable Flash Units Having Individual Striker Elements and Photographic Apparatus for using such Units," filed Oct. 8, 1968, in the name of David E. Beach.

BACKGROUND OF THE INVENTION

1. Field of the Invention

This invention relates to flash photography and more particularly, to photographic apparatus such as still cameras with built-in photoflash systems to control the firing of percussively ignitable flashlamps.

2. Description of the Prior Art

Various devices have been proposed for adjusting a camera equipped with electrically ignited flashlamp structure from a daylight mode of operation to a flash mode in accordance with the ambient light conditions encountered. In these devices, means have been provided to electrically open or close an electrical flash firing circuit either by means measuring the ambient light level or by manual control means. Such devices are desirable because, if additional illumination is needed, the operator need not waste time inserting a flashlamp. Alternatively, if flash is not needed the operator need not remove the lamp to prevent inadvertent firing.

Also cameras employing rotatable flash units such as flashcubes are known, and a device, disclosed for example in U.S. Pat. No. 3,406,620, issued Oct. 22, 1968, has been proposed to prevent firing and indexing of such flash cubes unless conditions warrant flash operation.

Recently, there has been developed a flashlamp that is percussively ignitable and may be incorporated in a disposable multilamp photoflash unit or package containing a plurality of such lamps. Examples of percussively ignitable lamps and units are disclosed, for example, in copending U.S. applications Ser. No. 765,930, filed Oct. 8, 1968, "Multilamp Flash Unit" and Ser. No. 765,930, filed Oct. 8, 1968, "Percussion Activatable Flash Units Having Individual Striker Elements and Photographic Apparatus for using such Units"; both applications filed in the name of David E. Beach. The former application describes a multilamp unit in which the percussion element of each lamp is exposed for striking by suitable means. The latter application describes a package in which the percussion element of each lamp is contained within the unit and a percussion striker in the unit is exposed for release by suitable means.

SUMMARY OF THE INVENTION

The present invention is an improvement in photographic apparatus, such as a still camera, having means for accepting such percussively fired lamps. As such, the invention comprises means for selectively controlling the firing of such lamps, either manually or automatically, without requiring removal of the lamps. Where the lamps are incorporated in a package such as a flash cube, means also are provided to provide indexing of the package only when the lamp in the operating position is fired.

In a preferred embodiment of the invention, a mode selector member, positioned either by manual means or by a light level measuring device, cooperates with a flash firing control member, which selectively controls lamp firing and also controls indexing of a multilamp package.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which:

FIG. 3 is a front view of the preferred embodiment of FIG. 2; and

FIGS. 4 and 5 are top views showing the preferred embodiment in two stages of operation of the invention.

DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

Figure 1:
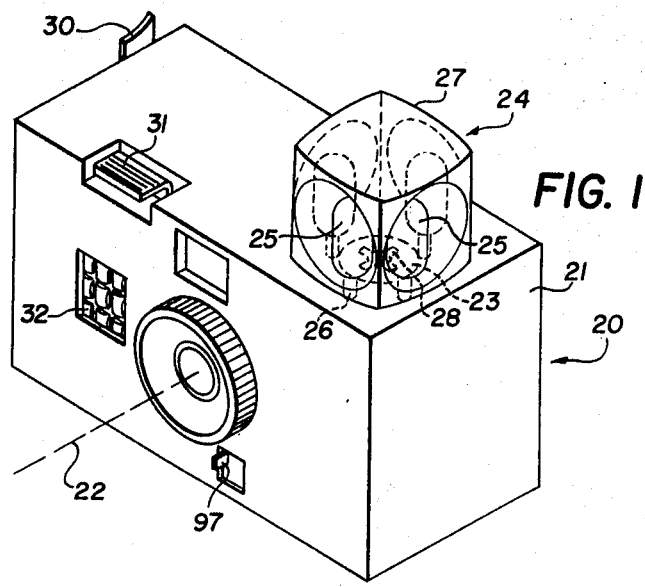
FIG. 1 is a perspective view of a photographic still camera embodying the present invention, together with a suitable flash unit containing a plurality of percussively fired lamps.

With reference to FIG. 1, there is shown a photographic roll film still camera 20 comprising a lighttight camera body 21 having a picture-taking or lens axis 22 on which are located the usual focusing lens and film plane for holding a frame of a roll of photosensitive film (not shown). The camera shutter mechanism and diaphragm are also positioned to be in operative relationship along the axis 22 to expose a frame of film located at the film plane.

Accessibly located at the top wall of the camera body 21 is a multilamp package-receiving socket 23 designed to receive a multilamp photoflash unit 24 containing a plurality (four) of percussively ignitable flashlamps 25. The lamps of package 24 and a suitable receiving socket are more fully described in the copending applications referred to above. Briefly, however, the photoflash lamps 25 are ordinately mounted in a vertical position about a vertical axis of rotation on a substantially square base. Depending from the base of each lamp 25 is an exposed tube 26 containing a percussively ignitable material that burns when the tube 26 is struck by a high-energy percussion striker in the camera. However, the present invention also may use a flash unit having the percussion striker in the flash unit, in which case the camera striker is an actuator to release the percussion striker in the cube. Individual light reflectors are positioned behind each lamp 25 and an overall light-transmitting protective cover 27 is provided. The package base defines the four lamp sides and includes a depending center connector post 28 that retains tubes 26 and is received in an opening of socket 23 in any one of four predetermined positions in which one of the lamps 25 is in the operative position.

The preferred embodiment of this invention suitably may be incorporated in a camera having the camera-operating and flash cube indexing mechanism disclosed in U.S. Pat. No. 3,353,467. As described therein, roll film is wound along the film plane, for positioning successive frames of film on the film plane, by an accessible film winding lever 30. The lever 30 also sets the camera shutter operating mechanism, which is released by an accessible body release member 31 to expose the positioned film frame by admitting light along the axis 22 for a predetermined time. The shutter time and/or exposure aperture may be determined automatically by any known exposure control system that senses ambient light through a photoresponsive element 32.

Referring to FIG. 4, the film winding lever 30 rotates a film takeup reel (not shown) in a counterclockwise direction (looking down) through a suitable clutch arrangement by means of a pinion drive gear 33 cooperating with an arcuate rack arm 34 on the winding lever 30. The winding lever 30 also includes a shutter-cocking foot 35 which acts to set the shutter mechanism as the film is being wound.

A suitable shutter mechanism comprises a shutter-striking plate or driver 36 which rotates about a pivot pin 37. An upstanding lug 38 on the striking plate 36 is engaged by cocking foot 35 to move the plate 36 clockwise (looking down) against the bias of a strong spring 39. Referring to FIG. 3, the shutter itself comprises a pivotable impact shutter blade 40 having an ear 41 in the path of a finger 42 on the striking plate 36. A lighter spring 43 normally holds the blade 40 in a position covering the exposure aperture, and a latch 45 on the camera body release 31 is normally in the path of movement of finger 42 to prevent shutter operation until the body release is depressed. Upon release of the cocked striking plate by depressing the body release 31 to pivot clockwise (FIG. 3) against a retaining spring 44, the action of spring 39 causes the finger 42 to move to the right as shown in FIG. 3, striking ear 41 and moving the shutter blade 40 off the exposure aperture against the bias of spring 43 for a predetermined time, the shutter blade 40 returning to cover the aperture by operation of the spring 43.

As shown in FIG. 4, to return the winding lever 30 to its initial position after each winding stroke or when released, there is provided a return tension spring 47 which is fixed to the camera body 21 at one end and attached at its other end to a slidable flash socket winding arm 50. The socket winding arm 50, which interconnects lever 30 and the flash-indexing mechanism to be described, is pivotally attached to the winding lever 30 by a pin-and-socket connection.

Referring to FIG. 3, the flash unit socket 23 receives the package connector post 28, with the lamp percussion tubes 26 exposed to cooperate with the camera-firing mechanism to be described. The package-receiving socket 23 (and inserted multilamp package 24) is automatically indexed or repositioned to present a fresh lamp in the operative position after a flash exposure. A spring drive mechanism as shown in U.S. Pat. No. 3,353,467, is energized as film is wound and the shutter cocked or set, and if the lamp is fired with camera operation, the drive mechanism acts automatically to rotate the socket 23 90° to place a subsequent lamp 25 in operative position.

The spring drive mechanism includes a rotatable socket-driving ring 70 positioned below the package socket 23. Ring 70 includes a fixed vertical winding pin 71 which is engageable by the hook end 72 of the socket winding arm 50.

A helical drive spring (not shown) fixed at one end to the ring 70 and at the other end to the camera body urges the ring in a clockwise direction (FIG. 4). Referring to FIGS. 4 and 5, as the winding lever 30 is operated, hook end 72 engages pin 71 and is guided by a guide edge 75 on the camera body to rotate the ring 70 from an original position shown in solid lines in FIG. 5 one-quarter turn in a counterclockwise direction to the position shown in FIG. 4. Upon completion of the 90° rotation, a latch tab 76 on a latch member 60, which is rotatable coaxially with the striking plate 36, engages a wedge-shaped latch shirt (not shown) on the periphery of ring 70. This rotation is against the bias of the helical drive spring which thus tends to rotate the ring 70 in the clockwise direction.

The top surface of the driving ring 70 defines clutch teeth engageable with corresponding teeth on the bottom surface of socket 23. As shown in FIGS. 4 and 5, cooperating teeth rotate the socket 23 clockwise with ring 70 by the drive spring, whereas ring 70 is permitted to be rotated counterclockwise by winding arm 50 without simultaneous rotation of the socket. When the ring 70 has been rotated counterclockwise by arm 50 to its energized position shown in FIG. 4, a stop plate 82 on latch member 60 is engaged by the striking plate 36 to maintain latch tab 76 stationary and prevent return rotation of the ring 70 until after camera operation as described.

To ensure proper positioning of the socket assembly 23 after indexing, body release 31 includes a positioning pawl 84 that is located in the front one of four notches 86 equally spaced on the periphery of the socket 23 to correspond to the flashlamp locations.

As stated, shutter operation is controlled by a release latch 45 on the body release member 31. Striking plate 36 then moves to permit latch member 60 to rotate by urging of the socket drive spring and permit socket indexing. In accordance with the present invention, however, socket indexing also is controlled by the flash striker mechanism to be described.

To provide for flash pictures, a lamp-firing mechanism is built into the camera body. The firing mechanism comprises a striker member 51 pivotable about a pin 52 and having a wedge-shaped striker pin 53 which when released strikes the percussion tube 26 of a flashlamp 25 in the operative position. Energy to the striker pin 53 is provided by a spring 55 connected at one end to striker member 51 and at the other end to the camera body. The striker member 51 is cocked during film wind by a tab 61 on latch member 60.

Figure 2:
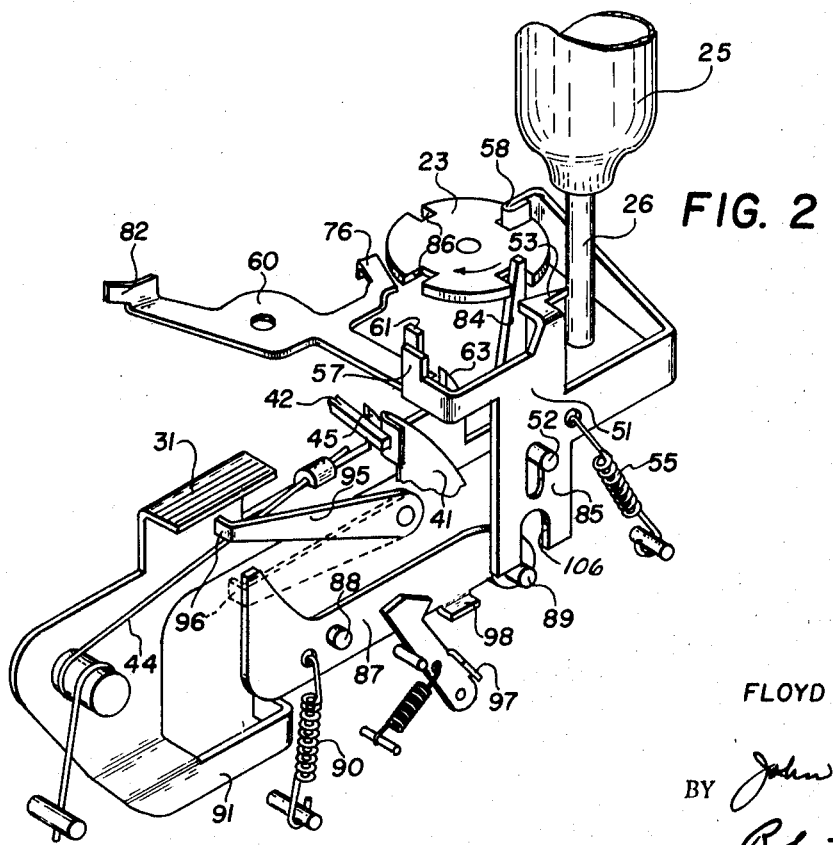
FIG. 2 is a perspective view showing a preferred embodiment of the present invention as incorporated in the camera of FIG. 1, together with associated camera elements.

As the camera shutter is being cocked, latch member 60 is rotated clockwise by plate 36, and, by engagement of tab 61 with a striker latch arm 57, the striker member 51 is moved counterclockwise about its pivot 52 against the bias of striker spring 55 from the released position shown in dotted lines in FIG. 3 to the cocked position shown in solid lines in FIG. 4 and also as illustrated in FIG. 2. In the cocked position of striker member 51, an indexing control pawl 58 on member 51 engages a notch 86 in the socket 23 to prevent socket rotation by ring 70 until after the striker member 51 has moved to its released position where pawl 58 is out of engagement with the notch 86. After lamp-firing socket 23 is permitted to index, the striking pin 53 by virtue of its wedge shape being cammed out of the way by tube 26 during rotation.

For flash operation, illumination is synchronized with film exposure by a latch end 63 on release member 31 normally in the path of movement of striker latch arm 57 when the striker member 51 is cocked. When the body release 31 is depressed, latch end 63 releases latch arm 57 and the movement of striking plate 36 releases latch member 60 to fire the lamp in timed relation with camera operation.

In accordance with the invention, the striker member 51 further includes a lower extension 85 defining a slot 106. A control lever 87 pivotable about an axis 88 includes a lockpin 89 that selectively is positioned in slot 86 to prevent movement of striker member 51 from the cocked position.

When control lever 87 is in the flash position as shown in solid lines in FIG. 3, pin 89 is out of slot 106, thereby permitting movement of striker member 51 to the released position. For camera operation without flash, the lever 87 assumes the dotted line or daylight position in FIG. 3, in which pin 89 is positioned in slot 106 to prevent movement of member 51. In the latter case, pawl 58 also remains in notch 86 to prevent socket rotation after camera operation.

Control lever 87 is biased to rotate counterclockwise (FIG. 3) by a spring 90 to assume the daylight or dotted line position. Normally, however, the control lever 87 is held in its solid line or flash position against its spring bias by an arm 91 on camera release member 31. When the camera is operated by depressing release member 31, lever 87 tends to assume its daylight position prior to shutter release.

Further in accordance with this invention, there is provided a camera operation mode selector lever 95 which is movable between a solid line position (FIGS. 2 and 3) for daylight operation and a dotted line position for flash operation. In the flash operation position, a tab 96 frictionally engages control lever 87 to prevent movement of lever 87 to its daylight position when the body release 31 is depressed.

Selector 95 may be manually movable between the daylight and flash positions or it may be moved automatically by an element in an exposure control system, as for example a needle-sensing clamp as disclosed in U.S. Pat. No. 3,406,620 issued Oct. 22, 1968. As disclosed in that application, the clamp moves a predetermined amount to clamp the needle of a moving coil galvanometer when the needle is positioned in the daylight range of the exposure control system. However, the clamp moves an additional amount when the needle is in position in low light range of the system. According to the present invention, the additional amount of movement then is transmitted by a suitable linkage to selector 95 to move the selector to its flash position. The additional motion also may be used to move mechanically by known means a "use flash" signal flag into the viewfinder of the camera.

Alternatively, it also may be desirable in a camera having an automatic exposure control system to fire the flash lamp for additional light even though the camera is set for daylight operation. In that case, a manual "fill-in" flash lever 97 may be provided, which lever is moved before camera operation to engage a tab 98 on lever 87 and retain lever 87 in its flash operation position regardless of the light level sensed by the exposure control system.

CAMERA OPERATION

To operate the photographic camera according to the preferred embodiment of the invention, the connector post 28 of a multilamp flash unit 24 is placed in the socket 23 with a fresh percussion flashlamp 25 in the operative position.

If a fresh frame of film is not at the film plane on the lens axis 22, the film is advanced by turning the film advance lever 30, thereby moving an unexposed film frame onto the film plane and setting the shutter by cocking the shutter striking plate 36 through cocking foot 35 on the film advance lever 30. Simultaneously, the socket-driving ring 70, if not energized by a prior operation, is rotated 90° counterclockwise against the bias of the helical drive spring from the solid line position shown in FIG. 5 to the position shown in FIG. 4, where ring 70 is held in position by latch tab 76. Pawl 84, which is in the forward notch 86 of the socket 23, prevents socket 23 and inserted flash unit 24 from rotating with ring 70. When film wind is thus completed, the driving ring 70 tends to rotate clockwise but is held in position by latch tab 76, latch tab 76 in turn being prevented from moving to release ring 70 because of the engagement by stop plate 82 with striking plate 36.

At this point, the winding lever 30 is permitted to return to its initial position by return spring 47, as shown in FIG. 5, and the camera is ready for operation with augmenting flash if ambient light conditions warrant.

This is accomplished by aiming the camera in the desired direction and depressing the body release member 31 to its fully depressed position as shown by dotted lines in FIG. 3. This motion initially permits movement of the control 87 and then releases the finger 42 of the cocked striking plate 36, which rapidly strikes the shutter ear 45 to cause the shutter blade 40 to uncap the diaphragm aperture according to the predetermined time. Simultaneously, latch 63 releases striker arm 57 and pawl 84 is removed from forward notch 86.

If the camera is set for daylight operation by positioning mode selector lever 95 in the solid line position as shown in FIG. 3, and if no fill-in flash is desired, lever 87 rotates as the release member 31 is depressed until pin 89 enters slot 106. It will be appreciated that this occurs before latch 63 otherwise releases striker arm 57. In that case, the striker pin is prevented from striking the lamp tube 26 and the ring 70 and socket 23 are prevented from rotating after camera operation. If, however, selector 95 is moved manually or has moved automatically to the flash position, or the "fill-in" flash lever 97 is operated, the pin 89 remains clear of slot 106 and striker pin 53 is moved by spring 55 at high energy to strike the lamp percussion tube 26 and fire the lamp 25 upon impact. After firing, pawl 58 is moved out of notch 86, permitting driving ring 70 and socket 23 to be rotated in the clockwise direction as shown in FIGS. 4 and 5 to move the next succeeding lamp into the flash operation position. After all four lamps in the inserted unit have been used, the unit is removed or ejected in any known manner.

Thus, it will be seen that regardless of the camera operating mode, a fresh flashlamp 25 from the multilamp package is in operating position, and a flash picture using percussion flash may be taken only if conditions warrant without requiring additional steps.

The invention has been described in detail with particular reference to a preferred embodiment thereof, but it will be understood that variations and modifications can be effected within the spirit and scope of the invention.

I claim:

1. In a photographic camera including:
   means for effecting an exposure including shutter release means;
   means for receiving a flashlamp unit of the type having at least one flashlamp fireable by striking an impact-receiving element; and
   a striker movable from a first position to a second position to strike said impact-receiving element to fire a received lamp;
   the improvement comprising:
   a control member movable in response to movement of said shutter release means between a first position in movement preventing engagement with said striker and a second position permitting movement of said striker;
   means for sensing scene light and for providing an output in response thereto; and
   a selector member for selectively moving said control member from its first to its second position in response to an output from said sensing means indicative of scene light below a predetermined level.

2. In a photographic camera including:
   means for effecting an exposure;
   means for receiving a flashlamp unit of the type having at least one flashlamp fireable by striking an impact-receiving element;
   a striker movable from a first position to a second position to strike said impact-receiving element to fire a received lamp;
   the improvement comprising:
   a control member engageable with said striker for preventing movement of said striker from said first position to said second position;
   means biasing said control member into such movement preventing engagement with said striker; and
   a selector member set in accordance with desired scene illumination and cooperating with the control member to retain the control member out of said movement preventing engagement thereby permitting movement of the striker member.

3. The invention according to claim 2 wherein the exposure-effecting means includes ambient light level sensing means and the invention further includes means responsive to said ambient light level sensing means for controlling said selector member to permit movement of said striker when sensed light is below a predetermined level.

4. The improvement according to claim 2 wherein said selector member is movable between a retaining position for retaining said control member out of movement-preventing engagement with said striker and a position permitting such engagement and wherein said selector member is manually movable between said two positions.

5. In a photographic camera including:
   means for effecting an exposure including a movable shutter release means;
   means for receiving a flashlamp unit of the type having at least one flashlamp fireable by striking an impact-receiving element;
   means for actuating firing of a received lamp, said means including an actuating member movable from a first position to a second position to actuate firing of said lamp and means for moving said actuating member from said first position to said second position;
   the improvement comprising:
   a control member adjustable in response to movements of said shutter release means between first and second conditions, said control member being effective in said first condition to prevent movement of said actuating member from its first position to its second position and in its second condition to permit such movement; and means for sensing scene light and for providing an output in response thereto, selector means for selectively adjusting said control member from its first to its second condition in response to an output from said sensing means indicative of scene light below a predetermined level.

6. In a photographic camera including:

means for effecting an exposure;

means for receiving a flashlamp unit of the type having at least one flashlamp fireable by striking;

means for actuating firing of a received lamp, said means including an actuating member movable from a first position to a second position to actuate firing of said lamp and means for moving said actuating member from said first position to said second position;

the improvement comprising:

a control member engageable with said actuating means for preventing movement of said actuating member from said first position to said second position;

means biasing said control member into such movement preventing engagement with said actuating means; and means operative in accordance with desired scene illumination for selectively retaining said control member out of movement preventing engagement with said actuating means to permit movement of said actuating member from said first position to said second position.

7. The improvement according to claim 6 wherein said means for retaining said control member out of movement preventing engagement with said actuating means is manually actuatable.

8. The improvement according to claim 6 wherein said receiving means is rotatable for sequentially indexing a plurality of such flashlamps to a firing site and said actuating means includes means for preventing rotation of said socket when said actuating member is in its first position and permitting rotation of said socket when said actuating member is in its second position.

9. The improvement according to claim 6 wherein said receiving means is a rotatable socket for receiving and sequentially indexing to a firing site a plurality of lamps in a flashlamp unit and wherein said camera further includes socket control means adjustable from a first condition preventing rotation of said socket to a second condition permitting rotating of said socket and means coupling said socket control means with said control member to adjust said socket control means to its permitting condition in response to movement of said control member to its movement permitting position.

10. In a photographic camera including:

means for effecting an exposure;

means for receiving a flashlamp unit of the type having at least one flashlamp fireable by striking;

means for actuating firing of a received lamp, said means including an actuating member movable from a first position to a second position to actuate firing of said lamp and means for moving said actuating member from said first position to said second position;

the improvement comprising:

a control member engageable with said actuating means for preventing movement of said actuating member from said first position to said second position;

means biasing said control member into such movement preventing engagement with said actuating means;

means for sensing scene light and for providing an output in response thereto; and means for preventing said biasing means from effecting movement preventing engagement between said control member and said actuating means in response to an output from said scene light sensing means indicative of scene light below a predetermined level.

11. In a photographic camera including:

means for effecting an exposure;

means for receiving a flashlamp unit of the type having at least one flashlamp fireable by striking an impact-receiving element; and means for actuating firing of a received lamp, said means including an actuating member movable from a first position to a second position to actuate firing of said lamp and means for moving said actuating member from said first position to said second position in timed relation with operation with said means for effecting an exposure; the improvement comprising:

a control member movable between a first control position and a second control position, said control member being effective in said first control position to prevent movement of said actuating member from its first position to its second position and in the second control position to permit such movement;

means biasing said control member into one of said control positions;

means for sensing scene light and providing an output in response thereto; and means for selectively retaining said control member in the other of said control positions in response to said output.